W. G. LAIRD.
REFRACTORY LINING.
APPLICATION FILED JULY 5, 1918.

1,328,380. Patented Jan. 20, 1920.

Inventor
Wilbur G. Laird
By His Attorney
Edmund G. Borden

UNITED STATES PATENT OFFICE.

WILBUR G. LAIRD, OF NEW YORK, N. Y., ASSIGNOR TO HENRY L. DOHERTY, OF NEW YORK, N. Y.

REFRACTORY LINING.

1,328,380.

Specification of Letters Patent. Patented Jan. 20, 1920.

Application filed July 5, 1918. Serial No. 243,387.

*To all whom it may concern:*

Be it known that I, WILBUR G. LAIRD, a citizen of the United States, residing at New York city, in the county of New York, State of New York, have invented certain new and useful Improvements in Refractory Linings; and I do hereby declare the following to be a full, clear, and exact description of the invention, such as will enable others skilled in the art to which it appertains to make and use the same.

This invention relates to refractory linings which are particularly adapted for lining furnaces that are subjected to high temperatures.

Many of the different types of refractory fire-brick which are made of such materials as fire-clay and silica are capable of withstanding the heats of most of the high temperature furnaces provided that fluxing material such as ash, alkalis, etc., do not come into contact with the brick while they are being subjected to the high temperatures. If such fluxes do contact with the bricks, the bricks will react with the fluxes and their melting point will be lowered so that the brick will soon be destroyed. So-called condensed refractories such as carborundum, fused alumina and condensed magnesia are very resistant to chemical fluxing action at high temperatures but the cost of producing the condensed refractories and forming them into the desired shapes is practically prohibitive for many types of furnaces. Various attempts have been made to bond a facing of a condensed refractory to firebrick by heat. Since the coefficient of expansion of the condensed refractories is very small as compared with the coefficient of expansion of fire-brick, any bond which may be made between a fire-brick and a condensed refractory facing is soon broken under the heat-changing conditions of a furnace so that the facing falls away from the brick.

The primary object of the present invention is to provide a refractory facing for a fire-resistant furnace lining which will effectively withstand chemical fluxing action and high temperatures.

When a furnace lining is subjected to high flame temperatures, the highly heated gases of the furnace tend to react more readily on an uneven surface than on a smooth surface. Inspection of a furnace lining which has been used shows that projecting portions and joints of the refractory materials are the first to be fused or worn away, and as the crevices become larger, the refractory is more rapidly destroyed.

Accordingly, another object of the invention is to provide a refractory furnace lining which will present a smooth surface to the combustion gases and which may be formed to any desired shape with a minimum number of refractory pieces of special shapes.

With these and other objects in view, the invention consists in the improved furnace lining hereinafter described and claimed.

The various features of the invention are illustrated in the accompanying drawings, in which, Figure 1 is an elevational view, partly in section, of a circular furnace lining embodying the preferred form of the invention;

Figure 1:
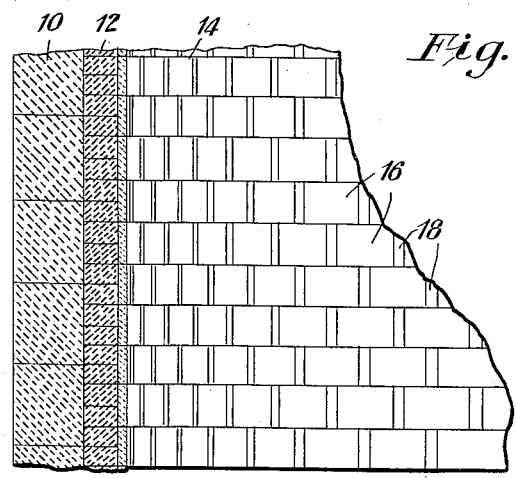

The refractory linings illustrated in the drawings are particularly adapted for furnaces for making gas, such as producer gas or water gas. Such furnace linings are subjected to both reducing and oxidizing atmospheres and the highest temperatures are generally reached with an oxidizing atmosphere at the time the furnace is being blasted with air to build up the temperature. During the blasting operation, the blasting gases carry fluxing materials such as ash, alkalis and silica against the refractory linings, and at the high temperatures of the furnace these fluxing materials are absorbed or react with the linings and cause them to fail. If the common refractory brick such as silica brick and fire-clay brick could be protected properly from contact with such fluxing materials by a non-fluxing high refractory facing, these brick are capable of withstanding the high temperatures of the furnace and will wear indefinitely.

In the illustrated embodiment of the invention, the furnace lining consists of a heat-retaining wall 10, a fire-brick backing 12, and a flux-resisting refractory facing 14. The heat-retaining wall 10 may be constructed of the ordinary clay brick or any material which is capable of withstanding comparatively high temperatures and should be sufficiently thick to prevent the heat of the furnace from passing through the wall. The fire-brick backing 12 may be constructed of any of the well known types of fire-brick, the character of brick depending upon the temperatures to which the furnace lining is subjected. These brick are generally built up against the retaining wall 10 with a refractory mortar. The non-fluxing refractory facing 14 consists of carborundum facing plates 16 and carborundum locking blocks 18 which are secured to the refractory backing 12. The locking blocks 18 preferably have a length which is substantially twice the thickness of the fire-brick 12, and have shanks 20 which are secured in the lining between the ends of adjacent bricks 12. Trapezoidal heads 22 are formed on the blocks 18, which are arranged to extend beyond the face of the refractory brick 12 and the inclined faces of these heads coöperate with inclined faces 24 on the ends of the facing plates 16 to form dovetail joints for holding the facing plates in position against the fire-brick backing.

Figure 2:
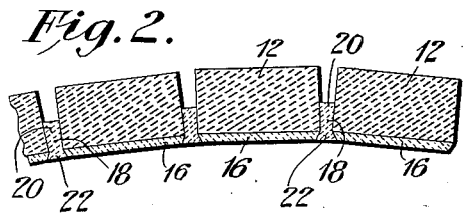
Fig. 2 is a horizontal sectional view of the furnace lining facing and backing, illustrated in Fig. 1.

In Fig. 2 is illustrated a curved wall lining for a furnace having a comparatively large diameter or a curved surface of comparatively low degree of curvature. In this form of lining, standard fire-brick are used which are positioned in a curved path so that the distance between the front corners of adjacent ends of the bricks is less than the distance between the rear corners. In this form of lining, the shank 20 of the locking block is trapezoidal in cross-section to correspond with the shape of the opening between adjacent bricks, and when the blocks are positioned between adjacent bricks they are securely held against withdrawal from the refractory backing. The trapezoidal shank of the locking block, moreover, does not need to extend entirely through the opening between adjacent bricks in order to be securely held in the backing so that a comparatively small carborundum block may be used. The locking blocks and facing plates are preferably set in the lining with a carborundum cement and all joints are filled with cement to insure a smooth inner surface.

Figure 4:
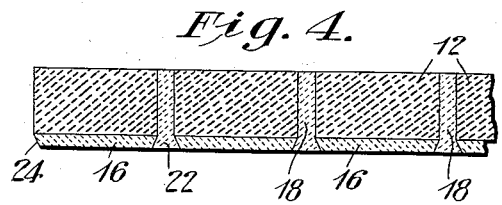
Fig. 4 is a horizontal sectional view of a straight wall lining facing and backing.

The form of refractory lining illustrated in Fig. 4 is a lining for a furnace having a straight wall. The shank of the locking block 18 for this type of lining has a rectangular oblong cross-section. Since the sides of this type of shank are parallel, the shank preferably is longer than the shank of the locking block shown in Fig. 2 in order to insure a strong anchorage in the fire-brick backing. The facing plates 16 for the lining shown in Fig. 4, as well as in Fig. 2, are flat oblong plates having plane faces and the rear faces of the plates are adapted to abut against the faces of the fire-brick 12.

Figure 3:
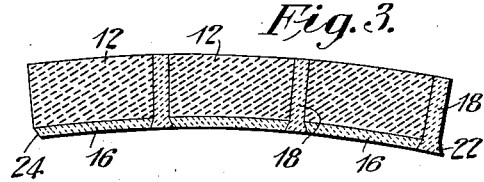
Fig. 3 is a horizontal sectional view of a modified form of a curved wall lining facing and backing.

In the type of lining illustrated in Fig. 3, the fire-brick 12 and facing plates 16 have a special shape to conform to the shape of furnace. With this type of lining, the degree of curvature is so high that the standard fire-brick such as shown in Figs. 2 and 4, cannot be used without producing a comparatively rough facing for the lining. The locking blocks 18 for this type of lining are the same as those illustrated in Fig. 4.

With the construction outlined above, a furnace lining can be produced which will wear practically indefinitely in a reducing or oxidizing atmosphere and when fluxing materials come into contact with the furnace lining. The non-fluxing carborundum material is securely held against the backing and effectively protects the fire-brick backing from fluxing action. The non-fluxing facing is preferably made of carborundum, although it may be made of fused alumina, condensed magnesia, or other suitable material to provide for the chemical and heat conditions to which it is to be subjected. Such condensed refractory materials have a very small coefficient of expansion but are comparatively good heat conductors. For this reason, the fire-brick 12 are heated to substantially the same temperatures as the refractory facings, but do not fail since they are protected from chemical fluxing.

Figures 5, 6:
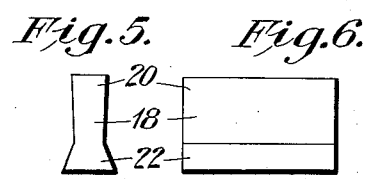
Fig. 5 is an end view.
Fig. 6 is a side view of a refractory locking block for holding the facing on the lining backing.
Figure 7:
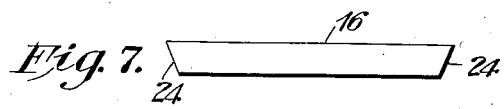
Fig. 7 is an end view.
Figure 8:
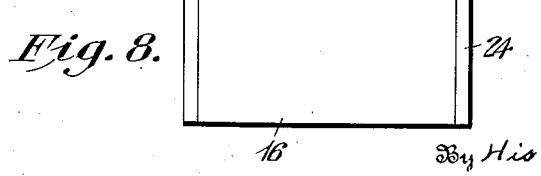
Fig. 8 is a plan of a refractory facing plate.

The refractory facing plates such as shown in Figs. 2, 4, 7 and 8 are very simple forms which are easy to mold and may be easily cured and burned since they may be supported upon edge or on either one of the plane faces. The refractory locking blocks 18 such as shown in Figs. 2, 5 and 6, may be used with most types of curved wall linings and will effectively tie the facing to the backing with a comparatively small amount of the expensive non-fluxing refractory. The use of the facing plates and locking blocks such as shown in Figs. 2, 4, 5, 6, 7 and 8, furthermore permits the use of standard shapes of refractory fire-brick, so that a furnace lining made up of these three shapes can be constructed very cheaply. The refractory locking blocks and facing plates illustrated in the drawings have a size which is adapted to cover the faces of two standard fire-bricks, but this size is of no importance and may be made larger or smaller to adapt the facing for any type of furnace lining.

The preferred form of the invention having been thus described, what is claimed as new is:

1. A refractory lining comprising a heat-resistant backing and a non-fluxing refractory facing secured to said backing consisting of refractory locking blocks embedded in said backing and thin refractory plates held by said blocks.

2. A furnace lining comprising a backing of standard fire-brick, carborundum locking blocks secured to said brick, and thin carborundum plates held in position against said backing by said blocks.

3. A furnace lining comprising a fire-resistant backing and a smooth surface non-fluxing refractory facing consisting of plates arranged in tiers and held in position by locking blocks embedded in said backing, the joints between said plates and blocks being in staggered relation in adjacent tiers.

4. A furnace lining comprising a refractory brick backing, refractory non-fluxing locking blocks secured between adjacent bricks and having trapezoidal heads and refractory non-fluxing plates having beveled ends interlocking with said heads.

5. A furnace lining comprising a fire-resistant ceramic backing, a series of refractory locking blocks embedded in said backing, and a series of refractory plates held in position against said backing by dovetail joints with said blocks.

6. A curved furnace lining comprising a refractory fire-brick backing, refractory non-fluxing locking blocks having trapezoidal heads and shanks, said shanks being secured between adjacent brick, and refractory plates having beveled ends coöperating with said trapezoidal heads.

7. A curved furnace lining comprising standard refractory brick having plane parallel faces laid on a curve, refractory locking blocks secured between adjacent bricks, and refractory facing plates having plane parallel faces held against said bricks by said locking blocks.

8. A refractory lining comprising a heat-resistant backing and a non-fluxing refractory facing secured to said backing, comprising refractory locking blocks embedded in said backing and thin refractory plates held in position against said backing by said blocks, the outer ends of said blocks being substantially in the plane of said plates and forming a portion of the facing surface.

In testimony whereof I affix my signature.

WILBUR G. LAIRD.